(12) United States Patent
Otani et al.

(10) Patent No.: US 6,765,166 B2
(45) Date of Patent: Jul. 20, 2004

(54) SWITCH CONTACT STRUCTURE

(75) Inventors: Toshiya Otani, Tokyo (JP); Takeshi Shibata, Tokyo (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 10/256,185

(22) Filed: Sep. 27, 2002

(65) Prior Publication Data

US 2003/0075422 A1 Apr. 24, 2003

(30) Foreign Application Priority Data

Oct. 22, 2001 (JP) .................................... P2001-323934

(51) Int. Cl.$^7$ ............................................ H01H 17/02
(52) U.S. Cl. ........................ 200/547; 200/571; 200/251
(58) Field of Search ................. 200/547, 549, 200/550, 541, 563, 571, 251, 252, 260

(56) References Cited

U.S. PATENT DOCUMENTS

| | | | | |
|---|---|---|---|---|
| 3,694,590 A | | 9/1972 | Otterlei ....................... 200/16 |
| 3,882,056 A | * | 5/1975 | Nakasone ................. 200/16 C |
| 4,737,602 A | * | 4/1988 | Yamamoto ............... 200/16 D |
| 4,825,020 A | * | 4/1989 | Rao et al. ................. 200/16 D |
| 5,708,241 A | * | 1/1998 | Lin ........................... 200/16 C |
| 6,011,224 A | * | 1/2000 | Zdanys, Jr. ............... 200/16 D |
| 6,384,357 B1 | * | 5/2002 | Morrison ..................... 200/520 |

FOREIGN PATENT DOCUMENTS

| | | |
|---|---|---|
| DE | 3037676 A1 | 5/1982 |
| FR | 1 557 136 | 2/1969 |
| FR | 2 335 932 | 7/1977 |

OTHER PUBLICATIONS

EPO Search Report dated Dec. 12, 2002.

* cited by examiner

*Primary Examiner*—Lincoln Donovan
*Assistant Examiner*—K. Lee
(74) *Attorney, Agent, or Firm*—Rader, Fishman & Grauer PLLC

(57) ABSTRACT

To reduce the number of components for facilitating assembly and parts management, and to ensure prevention of rattling of the movable block, a switch contact structure is disclosed, which comprises a substrate 63, a movable block 67 disposed so as to be movable along the substrate 63, a fixed contact 89 mounted on the substrate 63, and a movable contact mounted on the movable block 67, the movable contact being brought into and out of contact with the fixed contact 89 by the movement of the movable block 67 along the substrate 63, wherein the movable block 67 is provided with a resin spring portion 107 formed integrally therewith for urging the movable block 67 toward the substrate 63, and the movable contact plated or printed on the surface facing toward the substrate 63.

3 Claims, 7 Drawing Sheets

SWITCH CONTACT STRUCTURE

BACKGROUND OF THE INVENTION

1. Field of the Invention

The present invention relates to a switch contact structure.

2. Description of the Related Art

Hitherto, the switch contact structure of this type includes, for example, the one shown in FIG. 9 and FIG. 10, or the one shown in FIG. 11, which is disclosed in JP-A-11-250772. As shown in FIG. 9, a plurality of fixed contacts 202 are provided on a substrate 201, and a movable block 203 is disposed so as to be movable along the substrate 201 in the directions indicated by arrows G and H.

The movable block 203 is provided with a plurality of movable contacts 205 corresponding to the fixed contacts 202. The movable contact 205 includes a resilient arm 207 supported by the movable block 203 and a curved contact portion 209 at the distal end of the resilient arm 207.

The movable block 203 is provided with an engaging section 211, which projects upward from an elongated hole 215 formed on the partition wall 213. A control rod engages the engaging section 211, and thus the movable block 203 is capable of linear movement on the substrate 201 in the directions indicated by the arrows H and G in conjunction with the action of the control rod. The linear movement of the movable block 203 allows the contact portions 209 of the movable contacts 205 to be brought into and out of contact with the fixed contacts 202 on the side of the substrate 201 in a prescribed state to create the ON state and the OFF state.

Resiliency of the resilient arm 207 formed of conductive metal leaf spring material allows the contact portion 209 to make resilient contact with the fixed contact 202 to maintain a desirable contact pressure. In addition, pressing the movable block 203 toward the partition wall 213 by the resilient arm 207 may prevent rattling of the movable block 203.

The example shown in FIG. 11 is constructed in such a manner that the movable contact 219 is stored in a recess 217 on the movable block 203 via a contact spring 221. Therefore, in the case shown in FIG. 11, a resilient force of the contact spring 221 allows the movable contact 219 to be brought into resilient contact with the fixed contact 202, and simultaneously presses the movable block 203 against the partition wall 213 to prevent rattling of the movable block 203.

However, in the examples shown in FIG. 9, FIG. 10 or FIG. 11, since the movable contact 205 or the movable contact 219, and the contact spring 221 are provided separately from the movable block 203 formed of resin, the number of components increases and thus assembly and parts management are very complicated.

In the case of the movable contact 205 as shown in FIG. 10, since the resilient arm 207 is disposed obliquely with respect to the movable block 203, a resilient force exerted on the movable block 203 may be biased and thus it cannot prevent rattling of the movable block 203 satisfactorily.

Furthermore, in the example shown in FIG. 11, though the contact springs 221 on both sides gives a well-balanced resilient force to the movable block 203, the number of the contact spring 221 and the like significantly increases, and thus there arises such a problem that assembly and parts management become complicated. In addition, when assembling the movable contact 205 to the movable block 203, the movable contact 205 is liable to be dropped from the movable block 203.

In the example shown in FIG. 10, the separate movable contact 205 is mounted on the movable block 203, and in the example shown in FIG. 11, the separate movable contact 219 and the contact spring 221 are mounted on the movable block 203. Therefore, there arises such a problem that the movable contact 219 and the contact spring 221 are liable to be dropped at the time of assembly, and the movable block 203 is liable to rattle at the time of operation.

SUMMARY OF THE INVENTION

Accordingly, it is an object of the invention to provide a switch contact structure including a reduced number of components, thus facilitating assembly and parts management, and preventing the movable block reliably from rattling The invention according to (1) is a switch contact structure comprising a substrate, a movable block disposed so as to be movable along the substrate, a fixed contact mounted on the substrate, and a movable contact mounted on the movable block, wherein the movable contact is brought into and out of contact with the fixed contact by the movement of the movable block along the substrate, characterized in that the movable block is provided with a resin spring portion formed integrally therewith for urging the movable contact toward the substrate, and the movable contact plated or printed on the surface facing toward the aforementioned substrate.

The invention according to (2) is a switch contact structure comprising a substrate, a movable block disposed so as to be movable along the substrate, a fixed contact mounted on the substrate, and a movable contact mounted on the movable block, wherein the movable contact is brought into and out of contact with the fixed contact by the movement of the movable block along the substrate, characterized in that the movable block is provided with a resin spring portion formed integrally therewith for urging the movable contact toward the substrate, and the resin spring portion is provided with the movable contact plated or printed on the surface facing toward the substrate.

The invention according to (3) is a switch contact structure as set forth in (2), characterized in that the movable block comprises a base portion having a engaging section for coupling, and a resin spring portion of substantially diamond shape in cross section formed integrally with the base portion, and the movable contact is plated or printed on the resin spring portion at the top of the diamond shaped cross section.

According to the invention as set forth in (1), since a substrate, a movable block disposed so as to be movable along the substrate, a fixed contact mounted on the substrate, and a movable contact mounted on the movable block are provided, the aforementioned movable contact may be brought into and out of contact with the fixed contact by moving the movable block along the substrate.

Since the movable block is provided with the resin spring portion formed integrally therewith for urging the movable block toward the substrate, and the movable contact plated or printed on the surface facing toward the substrate, a separate contact spring for bringing the movable contact into resiliently contact with the fixed contact is not necessary, whereby the number of components may be reduced to facilitate assembly and parts management, thereby reducing the costs.

This arrangement allows reliable resilient contact between the movable contact and the fixed contact, and this reliable contact ensures prevention of loose connection.

Furthermore, since the resin spring portion is integrally formed with the movable block, the spring member is prevented from being dropped when being assembled and occurrence of rattling of the movable block can be reliably prevented.

According to the invention as set forth in (2), since a substrate, a movable block disposed so as to be movable along the substrate, a fixed contact mounted on the substrate, and a movable contact mounted on the movable block are provided, the movable contact may be brought into and out of contact with the fixed contact by moving the movable block along the substrate.

Since the movable block is provided with the resin spring portion formed integrally therewith for urging the movable block toward the substrate, and the resin spring portion is provided with the movable contact plated or printed on the surface facing toward the substrate, a separate contact spring for bringing the movable contact into resiliently contact with the fixed contact is not necessary, whereby the number of components may be reduced to facilitate assembly and parts management, thereby reducing the costs.

Since the movable contact is plated or printed on the surface of resin spring portion facing toward the substrate, reliable resilient contact between the movable contact and the fixed contact is achieved, and this reliable contact ensures prevention of loose connection. Furthermore, since the resin spring portion is integrally formed with the movable block, occurrence of rattling of the movable block can be reliably prevented.

According to the invention as set forth in (3), in addition to the effect of the invention in (2), since the movable block comprises, a base portion having a engaging section for coupling, and a resin spring portion of substantially diamond shape in cross section formed integrally with the base portion, and the movable contact is plated or printed on the resin spring portion at the top of the diamond-shaped cross section, the well-balanced resilient force of the resin spring portion of substantially diamond shape in cross section allows further reliable resilient contact between the movable contact and the fixed contact, whereby the reliable contact pressure ensures prevention of loose contact. Furthermore, since the resin spring portion can generate a well-balanced resilient force, rattling of the movable block is prevented further reliably.

DESCRIPTION OF THE PREFERRED EMBODIMENTS

FIG. 1 is an exploded perspective view of a combination switch for vehicles embodying the switch contact structure of the present invention. FIG. 2 is a cross sectional view of the first lever switch.

As shown in FIG. 1, the combination switch 1 for vehicles includes a body 3, and a first and second lever switches 5, 7. The body 3 is locked on a bracket 11 of the steering column 9, and secured by a setscrew 13. The body 3 is formed with a cancel pin P and a projection 15 adapted to engage the lower surface of the steering wheel and rotatably supports the cylindrical pipe 17 rotating with the steering shaft 16. The first lever switch 5 is inserted into the body 3 from the right side and the second lever switch 7 is inserted into the body 3 from the left side.

The first lever switch 5 has functions of, for example, a turn signal switch, a passing switch, a main-dimmer changeover switch, and a head light switch. The first lever switch 5 includes a switch section 19 and a control lever section 21. The switch section 19 is inserted into the body 3 as described above. The control lever section 21 includes a first revolving knob 23 at the distal end thereof as in FIG. 1 so as to be swingable in the fore-and-aft direction as indicated by the arrows A and B, and the vertical direction as indicated by the arrows C and D.

The first lever switch 5 has a function of a turn signal switch for flashing the direction indicator lamp by operating the control lever section 21 in the fore-and-aft directions indicated by the arrows A and B, a function of a passing switch for turning the head light on temporarily by moving the control lever section 21 to the upper limit of the arrow C, and a function of a main-dimmer changeover switch for switching the headlamp between the main and the dimmer by moving the control lever section 21 vertically as indicated by the arrows C or D. The control lever section 21 has a function of a headlamp switch for turning the headlamp and small lamp on and off by rotating the first revolving knob 23 in the direction indicated by the arrows E and F.

The second lever switch 7 is provided with a switch section 25 and the control lever section 27. The switch section 25 is inserted into the body 3 as described above. The control lever section 27 has a function of a wiper and washer switch, and is adapted to be operated in the fore-and-aft and vertical directions in the same manner as the control lever section 21. The revolving knob 29 provided at the distal end thereof has a function to adjust the wiper speed.

As shown in FIG. 2, the first revolving knob 23 is attached at one end of the second lever shaft 35 rotatably inserted into the hollow first lever shaft 31 that passed through the control lever section 21, and the first control rod 33 is fitted at the other end of the second lever shaft 35. A first fixed knob 24a and a second fixed knob 24b formed integrally with the control lever section 21 are fitted on the first lever shaft 31, and a second revolving knob 22 is rotatably provided thereon. A substrate having a fixed contact on which a movable contact provided on the second revolving knob 22 is fitted on the second fixed knob 24b on the surface facing toward the second revolving knob 22. A harness 26 to be connected to the electric circuit disposed on the vehicle body side, such as a fog lamp, is soldered on the substrate. The first lever shaft 31 is formed with a through hole 37 through which the first control rod 33 is inserted, and with a shaft 59 projected from the left and right side surfaces in the direction orthogonal to the through hole 37.

The first lever shaft 31 is provided with a detent body supporting tube 39 at the other end thereof, and a detent spring 41 and a detent body 43 are accommodated therein. One end of a second control rod 45 formed of a L-shaped link material is rotatably connected to the left and right side surfaces of the detent body supporting tube 39. The second control rod 45 is rotatably supported on the rotatably supporting strip 53a whereof the center portion is pended from the inner top surface of the movable member 53 and is connected to the second movable block 69 on the other end thereof. The second control rod 45 rotates about the central axis when the control lever section 21 is swung in the directions indicated by the arrows C, D, and the second movable block 69 connected to the other end moves linearly to the extent magnified by the lever ratio.

The switch section 19 is provided with a case 47 and a lid member 49 to be fitted on the upper opening of the case 47. A partition wall 51 is provided in the case 47 on the bottom side, and a movable member 53 is disposed above the partition wall 51. The movable member 53 is rotatably supported on the upper end on the lid member 49 via the shaft 55 thereof, and is formed with a detent groove 57 constructed of V-shaped cam surface. The control lever section 21 is rotatably supported on the movable member 53 via the shaft 57 and the detent body 43 is brought into resilient contact with the detent groove 57. The movable member 53 is formed with a third control rod 61. Provided on the left and right on the surface of the movable member 53 on the side of the steering shaft 16 are detent members for supporting the control lever 21 at the left and right direction indicating positions.

The substrate 63 is disposed under the partition wall 51. The substrate 63 is provided with a plurality of fixed contacts that will be described later on the upper side thereof, and a diode mounted on the lower side thereof. A connector terminal 65 is provided at the end of the substrate 63. The connector terminal 65 is projected in a hood 66 mounted on the substrate 63. The substrate 63 is provided with a cover 47a covering and protecting the substrate 63 and being formed integrally with a boot 47b.

The first movable block 67, the second movable block 69, and the third movable block 71 are disposed on the substrate 63 under the partition wall 51. The first and the third movable blocks 67, 71 are disposed so as to be linearly movable in the direction orthogonal to the plane of FIG. 2, and the second movable block 69 is disposed so as to be linearly movable in the lateral direction in FIG. 2.

It is constructed in such a manner that the headlamp is turned on and off by the linear movement of the first movable block 67, and changeover between the main and the dimmer and passing are made by the linear movement of the second movable block 69, and flashing of the direction indicator lamp is made by the linear movement of the third movable block 71.

The first and the third movable blocks 67, 71 are provided with engaging sections 73, 75, and the second movable block 69 is formed with a hole section 77 for moving the first, second, and third movable blocks 67, 69, 71 linearly as described above. The engaging section 73 engages the first control rod 33, the engaging section 75 engages the third control rod 61, and the hole section 77 engages the second control rod 45 respectively.

A cancel cam 79 is disposed between the case 47 and the lid member 49, and a vertical shaft 81 of the cancel cam 79 is loose fitted and rotatably supported in the lid member 49 and the movable member 53. The cancel cam 79 is urged toward the left in FIG. 2 by the leaf spring 83 held by the lid member 49 at both ends. A cam guide 85 placed on the movable member 53 is disposed behind (right side in FIG. 2) the cancel cam 79. The cam guide 85 is urged toward the cancel cam 79 by a coil spring 87 disposed between the cam guide 85 and the movable member 53.

When the operator moves the control lever section 21 in the directions indicated by the arrow A and B in FIG. 1 in cooperation with the cancel cam 79, the leaf spring 83, the cam guide 85, the coil spring 87, and the cancel pin P in FIG. 1 to give a movement direction by the turn signal, and then moves the steering wheel back, the control lever section 21 is returned automatically to the neutral position. Alternatively, the operator can hold the turn signal in the state of giving a movement direction by the compulsive operation of the control lever section 21 irrespective of movement of the steering wheel.

When the control lever section 21 is moved for example in the directions indicated by the arrows A and B in FIG. 1, the control lever section 21 rotates about the shaft 55 in the direction orthogonal to the plane of the figure with the movable member 53 as shown in FIG. 2. This rotary movement allows the third movable block 71 to move linearly in the direction orthogonal to the plane of the figure via the third control rod 61 and the engaging section 75, and the movable contact of the third movable block 71 is brought into contact with the fixed contact on the side of the substrate 63 to flash the direction indicator lamp to indicate left-hand turn or right-hand turn.

When the control lever section 21 is moved in the direction indicated by the arrows C or D in FIG. 1, the control lever section 21 rotates about the shaft 59 in the vertical direction, and moves the second movable block 69 linearly in the lateral direction via the second control rod 45 as shown in FIG. 2. The linear movement of the second movable block 69 allows the movable contact of the second movable block 69 to be brought into contact with the fixed contact on the substrate 63 and to perform changeover between the main and the dimmer, and passing.

When the first revolving knob 23 is rotated in the directions indicated by the arrows E and F in FIG. 1, the first control rod 33 rotates in the direction orthogonal to the plane of the figure via the first lever shaft 31 and allows the first movable block 67 linearly in the direction orthogonal to the plane of the figure via the engaging section 73 as shown in FIG. 2. This allows the movable contact of the first movable block 67 to be brought into and away from contact with the fixed contact on the side of the substrate 63 in the prescribed state to turn the headlamp or the front position lights on and off.

Referring also to FIG. 3 and FIG. 4, the structure of the first movable block 67 will be further described. FIG. 3 is a perspective view showing the relation between the substrate 63 and the first movable block 67 in a exploded manner and FIG. 4 is a partially broken side view of the first movable block 67.

As shown in FIG. 3 and FIG. 4, a plurality of fixed contacts 89 are provided on the substrate 63. The fixed contact 89 includes a fixed contact 89a with which the first movable block 67 is brought into and away from contact, a fixed contact 89b with which the second movable block 69 is brought into and away from contact, and a fixed contact 89c with which the third movable block 71 is brought into and away from contact.

The first movable block 67 is disposed so as to move linearly with respect to the fixed contact 89 in the directions indicated by the arrows G and H in FIG. 3 and FIG. 4. The first movable block 67 is formed of resin in its entirety, and provided with projecting ridges 92a, 92b for sliding contact on both edges of the upper surface of the base 91. The engaging section 73 is provided with a U-shaped engaging groove 95 between the engaging walls 93a and 93b projected upwardly from the base 91. The engaging section 73 projects upwardly of the partition wall 51 through the elongated hole 97 (FIG. 2) formed through the partition wall 51. Since the projecting ridges 92a, 92b are inserted into the elongated hole 97, the first movable block 67 moves linearly only in the directions indicated by the arrows G and H by being guided by the elongated hole 97.

A sliding portion 99 is provided at the midpoint of the base 91. Both ends 101a, 101b of the sliding portion 99 projected from the base 91 in the directions of movement indicated by the arrows G and H to increase the distance between them so that rattling of the first movable block 67 is reduced, and formed into enlarged circular in cross section so that the sliding friction is reduced. The sliding portion 99 fits in an elongated guiding groove 103 formed on the partition wall 53 in the G and H directions, and both ends thereof 101a, 101b are guided in the guiding groove 103. In other words, the sliding portion 99 is adapted to be guided and slid along the guiding groove 103 smoothly without being rattled owing to the enlarged ends 101a, 101b. The first movable block 67 is guided at two points; engagement between the projecting ridges 92a, 92b and the elongated hole 97, and engagement between the sliding portion 99 and the guiding groove 103. The first movable block 67 is formed at both ends orthogonal to the sliding direction with regulatory projections 105a, 105b projecting toward the board surface of the substrate 63.

A resin spring portion 107 is formed of resin integrally with the first movable block 67 on the lower surface of the base 91 between the regulatory projections 105a, 105b. Six resilient portions each formed substantially in the shape of diamond in cross section by the upper and lower plate-shaped arms 109a, 109b formed along the direction of movement indicated by the arrows G and H of the first movable block 67 and the connecting portion 111 connecting the arms 109a, 109b are connected via the contact supporting portions 113 provided at the lower ends thereof, so that each resin spring portion 107 is liable to deform resiliently only in the vertical direction as a whole.

The apex of the resin spring portion 107, that corresponds to the lower end, is provided with a contact supporting portion 113 formed in the direction orthogonal to the direction of movement of the first movable block 67 indicated by the arrows G and H. The contact supporting portion 113, is substantially elongated rod shape having the same length as the base 91 so as to connect the apexes of the respective resin spring portions 107. The surface of the contact supporting portion 113, which is brought into contact with the lower substrate 63, is formed in a curved surface to improve the sliding property. The contact supporting portions 113 connecting the resin spring portions 107 prevents the respective resin spring portion 107 from resiliently deforming in the direction orthogonal to the direction of movement of the first movable block 67 indicated by the arrows G and H, so as to prevent the movable contact 115 from being brought into contact with the fixed contacts 89a other than the prescribed one and causing loose connection.

The contact supporting portion 113 is provided with movable contacts 115 along the surface of the resin spring portion 107 facing toward the substrate 63, or the lower surface of the contact supporting portion 113 at the apex of the resin spring portion 107 of substantially diamond shape in cross section, at the portions corresponding to the fixed contacts 89a. The movable contact 115 is formed by plating or printing. In the case of plating, for example, the same method as a three-dimensionally designed circuit MID (Molded Interconnect Device), or plating is employed.

When the first movable block 67 is assembled as shown in FIG. 2, the base 91 abuts against the lower surface of the partition wall 51 and is constrained, and the resin spring portion 107 is bent to exhibits its resiliency, so that the movable contact 115 of the contact supporting portion 113 is brought into resilient contact with the substrate 63. In this case, the plurality of resin spring portions 107 formed substantially into symmetrical diamond shape in cross section allow the respective movable contacts 115 on the contact supporting portion 113 to be brought into contact with the substrate 63 with a well-balanced contact pressure. They also allow the projecting ridges 92a, 92b of the base 91 to be slid on the lower surface of the partition wall 51 in a balanced manner.

Therefore, contact between the movable contact 115 and the fixed contact 89a is ensured, and thus loose connection can be reliably prevented. Provision of a well-balanced resilient force with respect to the base portion 91 ensures prevention of rattling of the movable block 67. Furthermore, since the movable contact 115 is plated or printed, separate contact and contact spring for bringing the movable contact 115 into resilient contact with the fixed contact 89a are not needed, whereby the number of components may be reduced, thereby facilitating assembly and parts management and hence reducing the costs.

In the case of generating a well-balanced resilient force as described above, it can be generated by the resin spring portion 107 that is integral with the movable block 67. Therefore, it is not necessary to arrange the plurality of contact spring in the direction of balance as in the related art, and thus increase in number of components can be reliably prevented.

Furthermore, when a plurality of resin spring portions 107 are provided at a plurality of locations corresponding to the respective fixed contact points 89a as described above, the number of components does not increase, and thus assembly and parts management are facilitated in this point.

(Second Embodiment)

FIG. 5 is a cross sectional view of the first movable block 67A showing a second embodiment of the present invention. As shown in FIG. 5, in the present embodiment, a resin spring portion 107A formed integrally with, a lower surface of a base portion 91A of a first movable block 67A is constructed of resilient legs 117a, 117b broadening in the fore-and-aft direction in the direction of movement indicated by the arrows G and H. The resilient legs 117a, 117b are formed on the lower surface of the first movable block 67A in a symmetrical curved shape with respect to the centerline of the first movable block 67A. Resiliencies of the resilient legs 117a and 117b are set to be equivalent so that the first movable block 67A are not inclined. The distance between the resilient legs 117a, 117b is broadened in the direction of movement of the first movable block 67A indicated by the arrows G and H, and each of them is formed of a arc-shaped plate. This allows the resilient legs 117a, 117b to have resiliency in the vertical direction and to have a function of contact spring for providing the contact pressure. Each of the left and right resilient legs 117a, 117b is constructed of a single leg or of a set of pluralities of legs, and a desired number of fixed contacts 89a are provided on the lower sliding surface. The resilient legs 117a, 117b are provided with movable contacts 119 corresponding to the respective fixed contacts 89a, for example, at six positions in the direction orthogonal to the figure as in the case of the first embodiment. The lower surfaces of the resilient legs 117a, 117b, which correspond to the surfaces facing toward the substrate 63, are formed with movable contacts 119 plated or printed as is described above.

Accordingly, the same effects as the first embodiment may be exercised in the present embodiment as well. In this embodiment, since the resin spring portion 107A is constructed of a pair of resilient legs 117a, 117b, a spring member for providing the contact pressure or a member for holding the spring member are not necessary, whereby the construction may be simplified, and thus it may be manufactured easily at the lower costs.

(Third Embodiment)

FIG. 6 is a cross sectional view of the first movable block 67B according to the third embodiment. As shown in FIG. 6, in this embodiment, the resin spring portion 107B is provided integrally with the upper surface of the base portion 91B of the first movable block 67B. The resin spring portion 107B is constructed of a pair of symmetrical resilient arms 121a, 121b curved in the direction of movement of the first movable block 67B indicated by the arrows G and H. The resilient arms 121a, 121b are formed with spherical portions at the distal ends thereof, which are brought into resilient contact with the lower surface of the partition wall 51. Each of the left and right resilient arms 121a, 121b may include a single arm or a plurality of arms, and the number thereof is not specifically limited. The base portion 91B is formed with the desired number of movable contact 123 by plating or by printing on the surface facing toward the substrate 63 as in the case described above. The movable contact 123 comes into contact with the fixed contact at the portion provided on the surface of the projection formed on the lower surface of the first movable block 67 for sliding on the substrate 63.

The resilient arms 121a, 121b of the resin spring portion 107B are respectively provided immediately above the portions whereon the movable contact 123 comes into contact with the fixed contacts 89a on the substrate 63, so that the movable contacts 123 can be brought into resilient contact with the fixed contacts 89a reliably by a resilient force of the resilient arms 121a, 121b. However, the resin spring portions 107B do not have to be provided as many as the number of the fixed contacts 89a as in the case described above, and they may be provided only on the respective ends of the base portion 91B in the direction orthogonal to the figure.

Therefore, in the present embodiment, almost the same effects as the embodiment described above may be exercised. Furthermore, in the present embodiment, the number of the resilient arms 121a, 121b may be reduced to simplify the structure.

(Fourth Embodiment)

FIG. 7 and FIG. 8 relate to the fourth embodiment of the present invention. FIG. 7 is a cross sectional view of a movable block, and FIG. 8 is a side view of the same. In this embodiment, a first movable block 67C is integrally formed with resin spring portion 107C, for example, at four locations. The resin spring portion 107C is constructed in such a manner that the upper and lower arms 123a, 123b are connected in a projecting manner on both sides of the base portion 91C in the direction indicated by the arrows G and H, the arms 123b are connected with the bottom portion 123c, and arc-shaped projections 123d are provided between the bottom portion 123c and the respective arms 123b. The movable contacts 125 are formed including the lower surfaces of the projections 123d that face toward the substrate 63, and only the movable contacts 125 formed by plating on the projections 123d come into sliding contact with the platen surface and the fixed contacts on the substrate 63.

Accordingly, in the present embodiment, almost the same effects as the embodiment described above may be exercised. Furthermore, in the present embodiment, since the arms 123a, 123b of the resilient spring portions 107C are formed so as to project outward to form the shape of smaller-than sign or larger-than sign, when the first movable block 67C is pressed from above, the arms 123a and 123b deform so as to be bent, and thus a well-balanced resilient force may be provided at each projections 123d, whereby the movable contacts 125 are brought into reliable contact with the substrate 63 at the portions of projections 123d. In addition, a well-balanced resilient force may be provided to the base portion 91c by the respective arms 123a, 123b on both sides, which ensures further reliable prevention of rattling of the base portion 91C.

Figure 1:
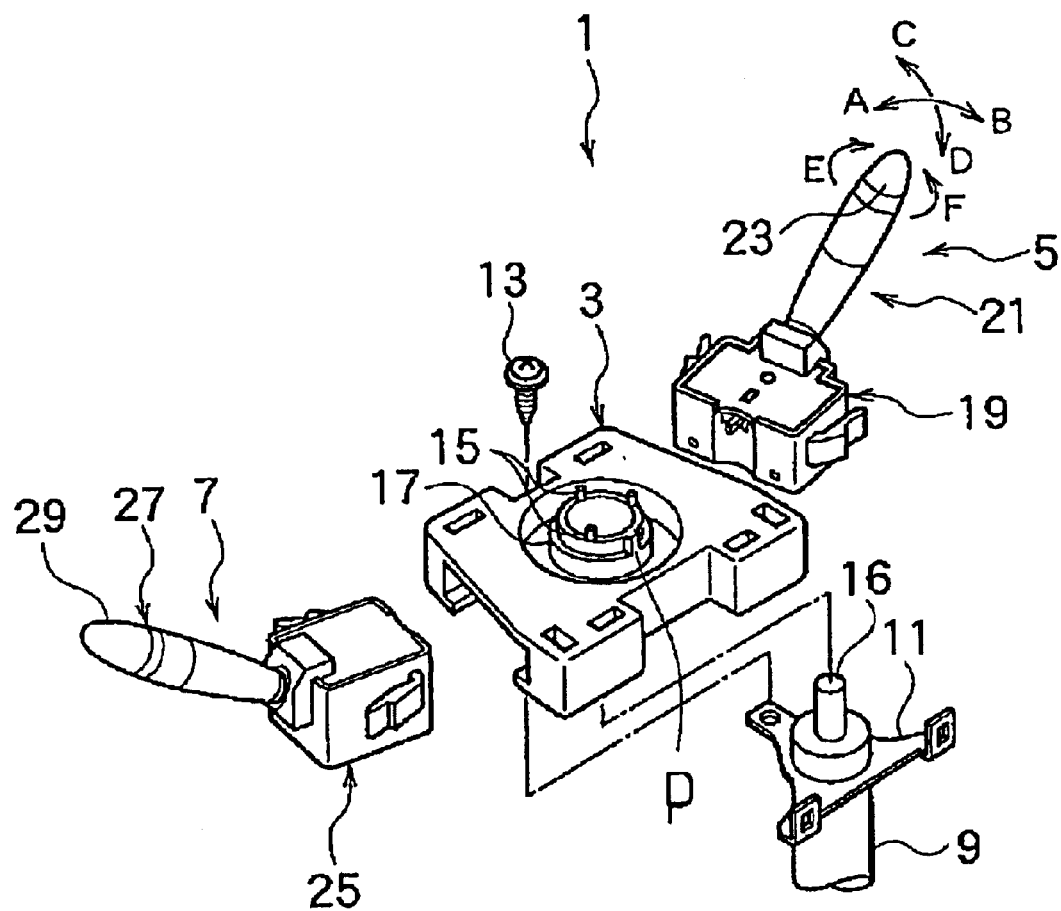
FIG. 1 is an exploded perspective view of a combination switch for vehicles embodying an embodiment of the present invention.
Figure 2:
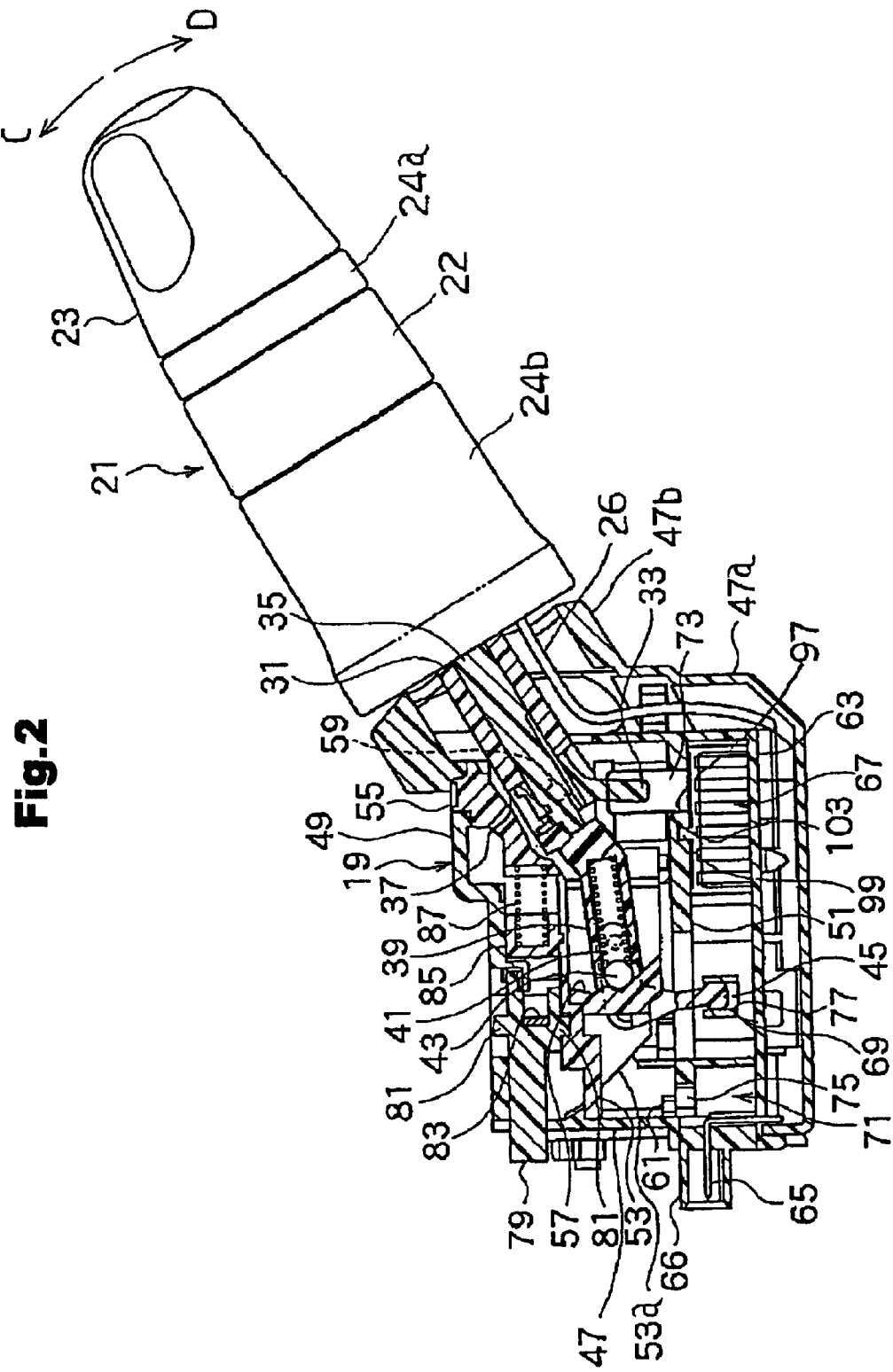
FIG. 2 is a cross sectional view of the first lever switch according to an embodiment.
Figure 3:
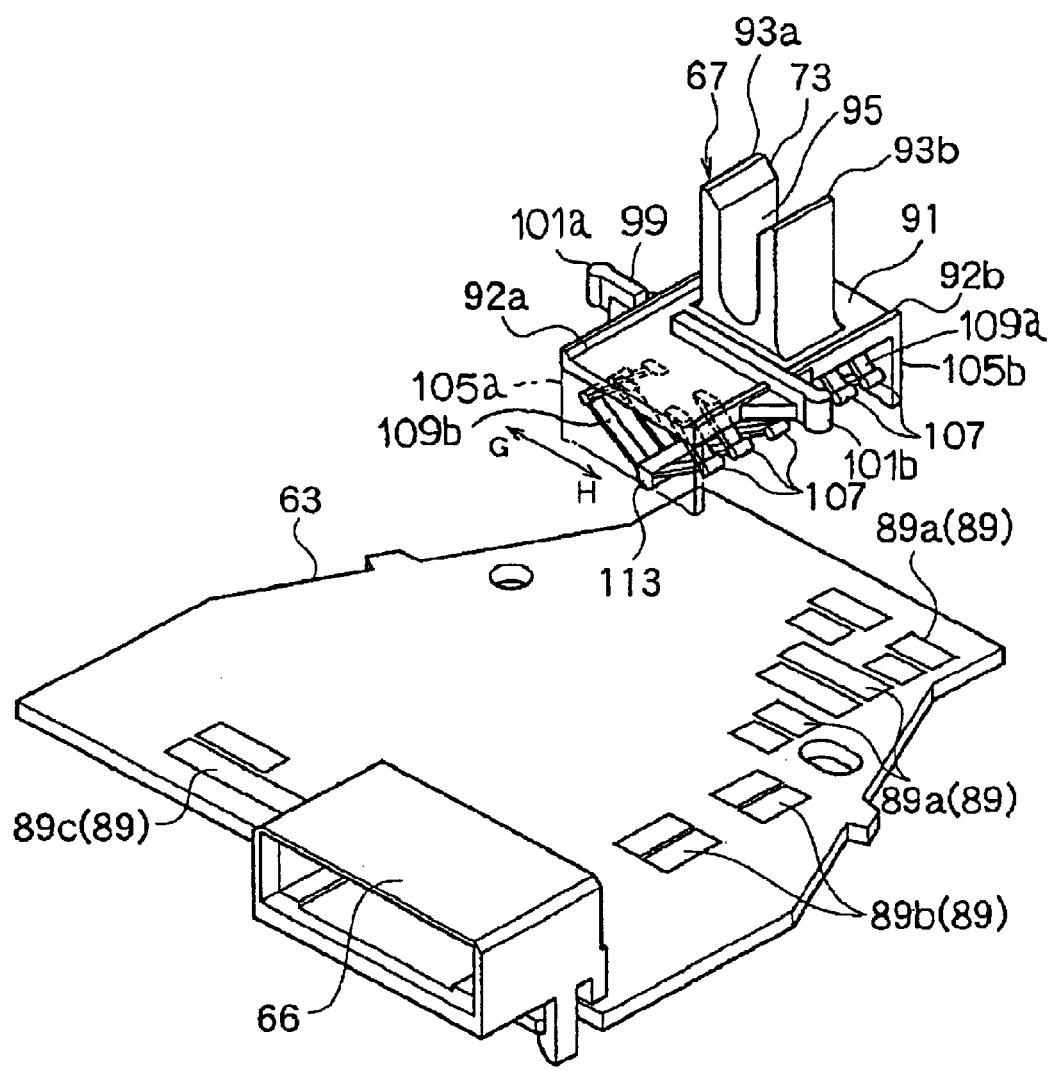
FIG. 3 is an exploded perspective view showing a relation between the first movable block and the substrate according to an embodiment.
Figure 4:
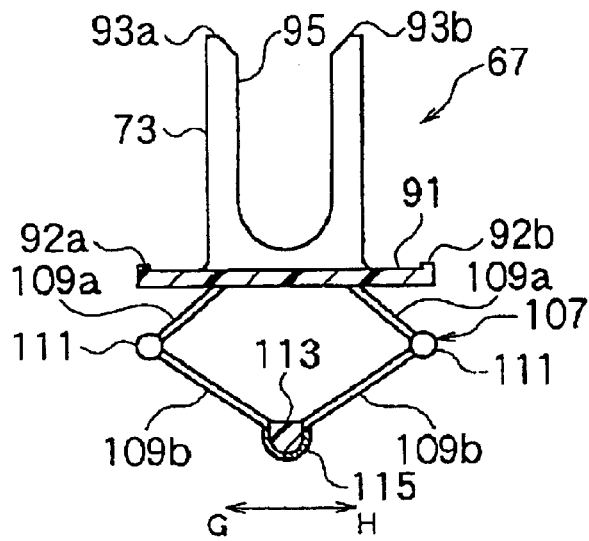
FIG. 4 is a cross sectional view of the first movable block according to the first embodiment.
Figure 5:
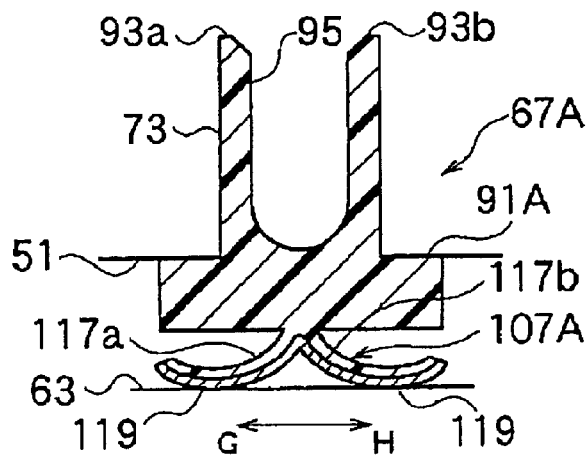
FIG. 5 is a cross sectional view of the first movable block according to the second embodiment of the present invention.
Figure 6:
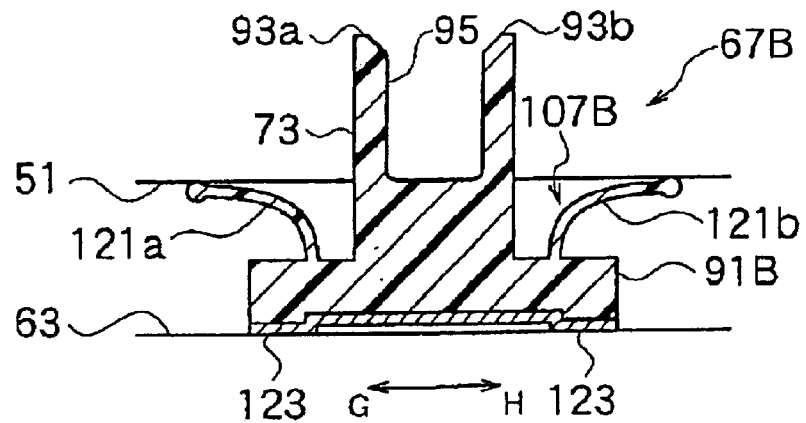
FIG. 6 is a cross sectional view of the first movable block according to the third embodiment of the present invention.
Figure 7:
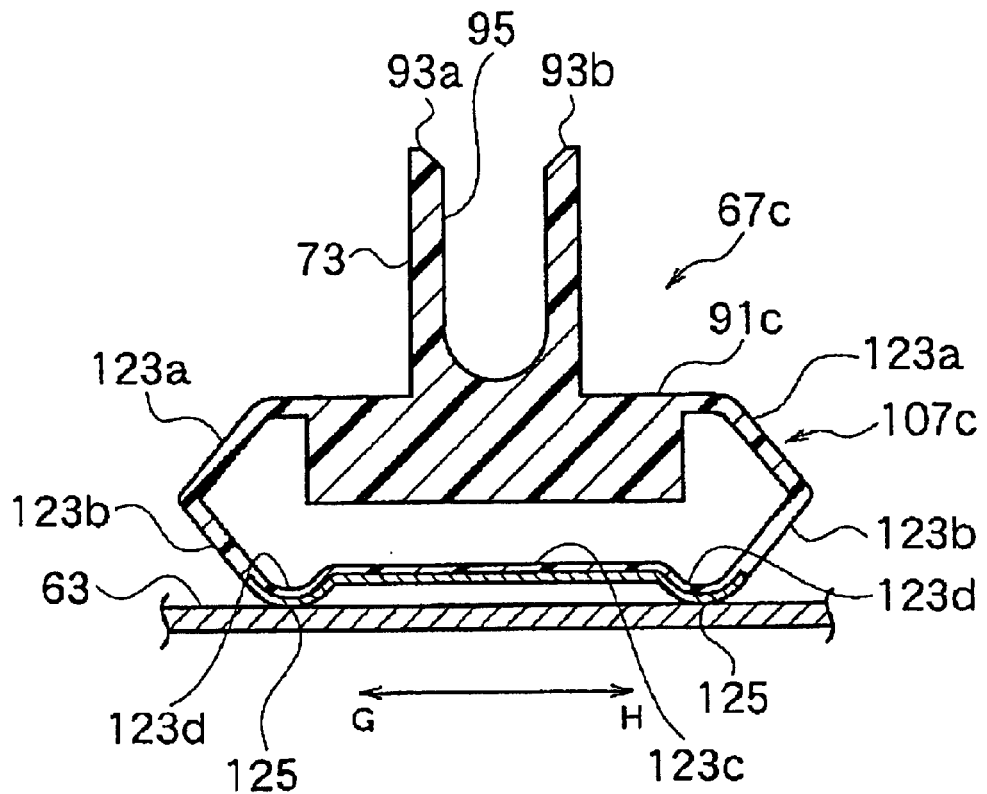
FIG. 7 is a cross sectional view of the first movable block according to the fourth embodiment of the present invention.
Figure 8:
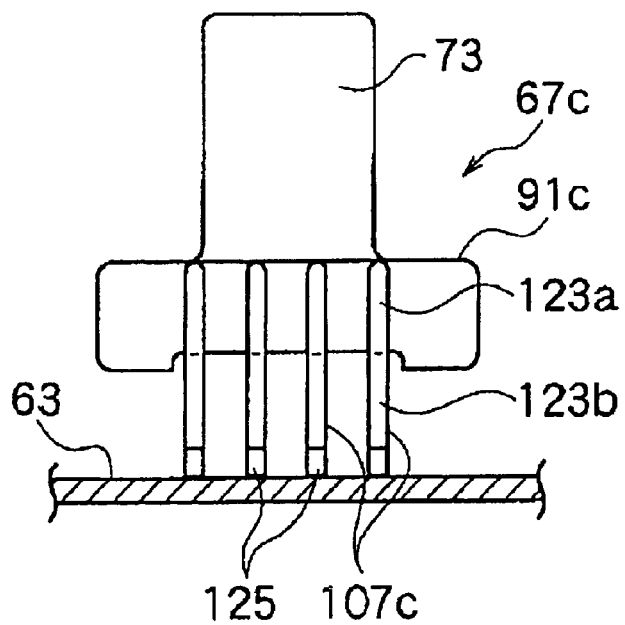
FIG. 8 is a side view of the first movable block according to the fourth embodiment.
Figure 9:
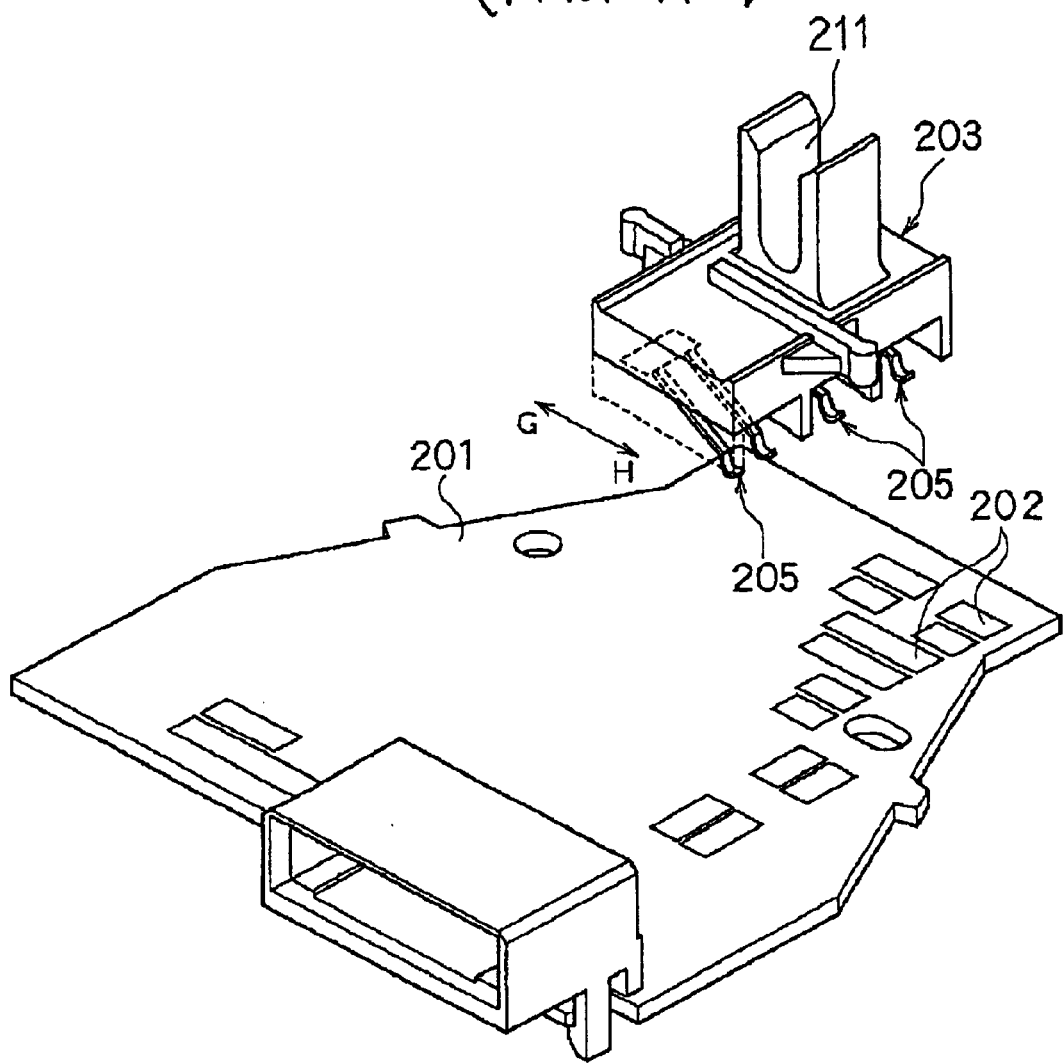
FIG. 9 is an exploded perspective view showing the relation between the movable block and the substrate according to the related art.
Figure 10:
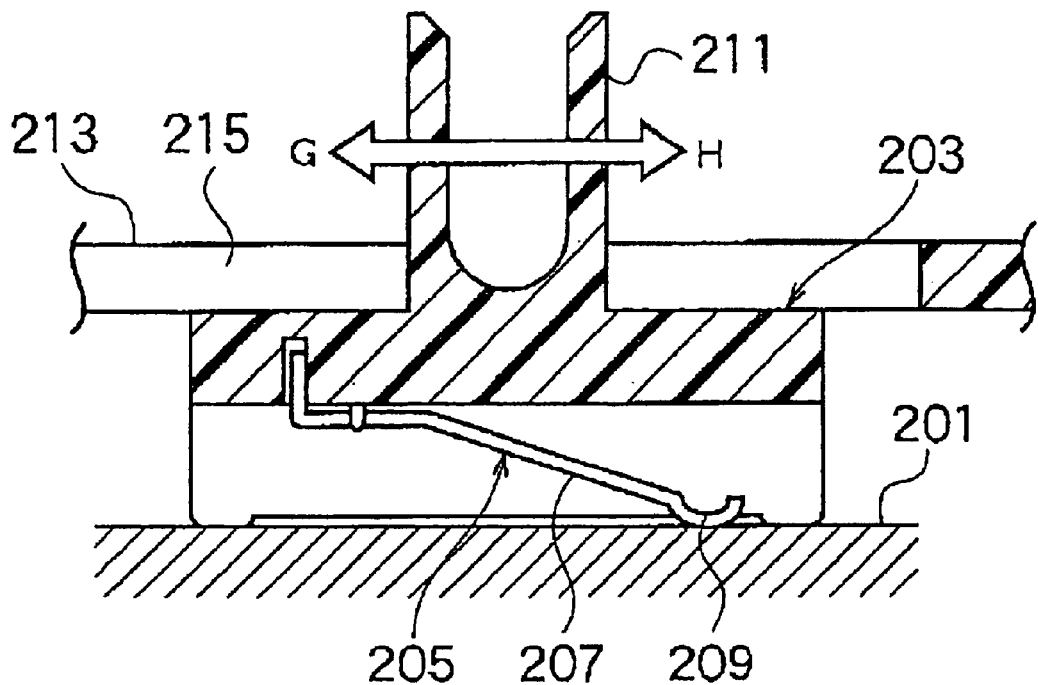
FIG. 10 is a cross sectional view showing a portion around the movable block according to the related art.
Figure 11:
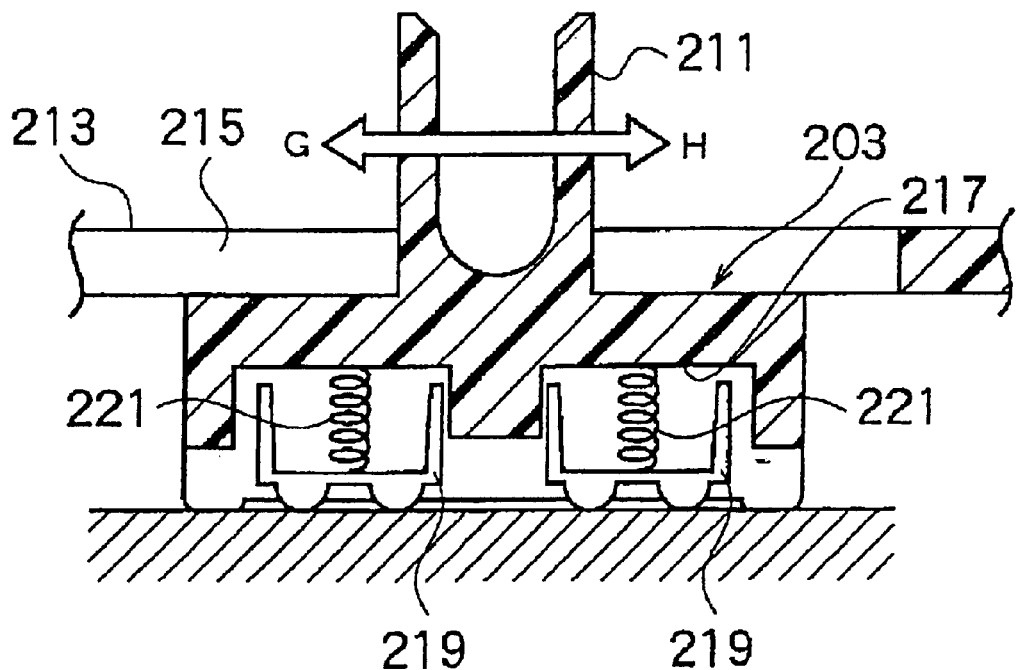
FIG. 11 is a cross sectional view showing a portion around the movable block according to another related art.

What is claimed is:

1. A switch contact structure comprising a substrate, a movable block disposed so as to be movable along the substrate, a fixed contact mounted on said substrate, and a movable contact mounted on said movable block, said movable contact being brought into and out of contact with said fixed contact by the movement of the movable block along said substrate, wherein
said movable block is provided with a resin spring portion formed integrally therewith for urging said movable contact toward said substrate, and the movable contact is plated or printed on a surface of said movable block facing toward said substrate;

wherein said movable block has a base, and said resin spring portion projects from said base and is resiliently deformable relative to said base; and wherein said surface on which the movable contact is plated or printed is on the base of the movable block.

2. The switch contact structure according to claim 1, wherein said plating or printing of the movable contact on the surface of the base of the movable block causes said movable contact to cover a portion of the surface of the base facing toward said substrate.

3. The switch contact structure according to claim 1, wherein said resin spring portion has right and left resilient arms which are brought into resilient contact with a surface of a partition wall to urge said movable contact toward said substrate.

* * * * *